United States Patent Office 3,548,622
Patented Dec. 22, 1970

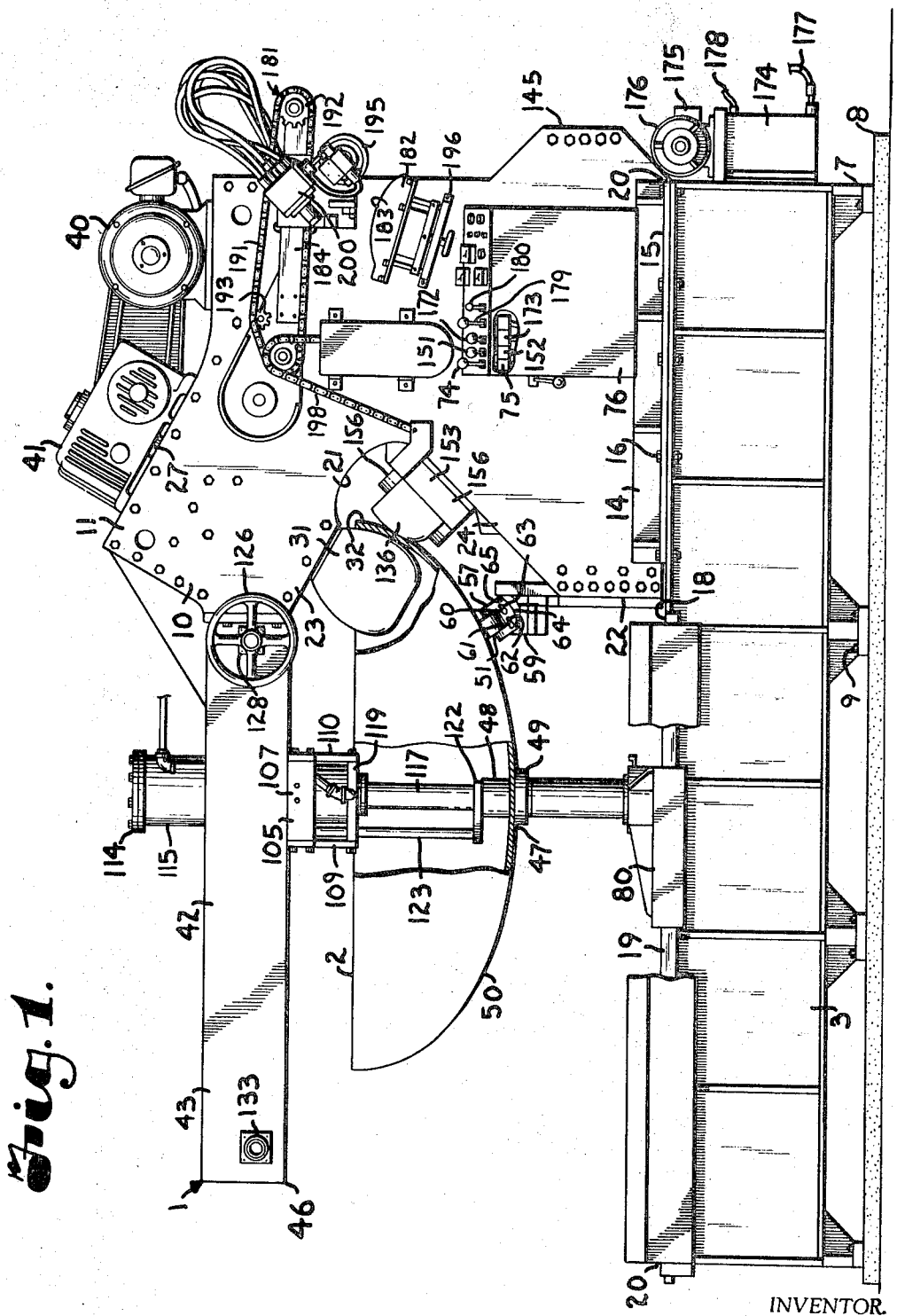

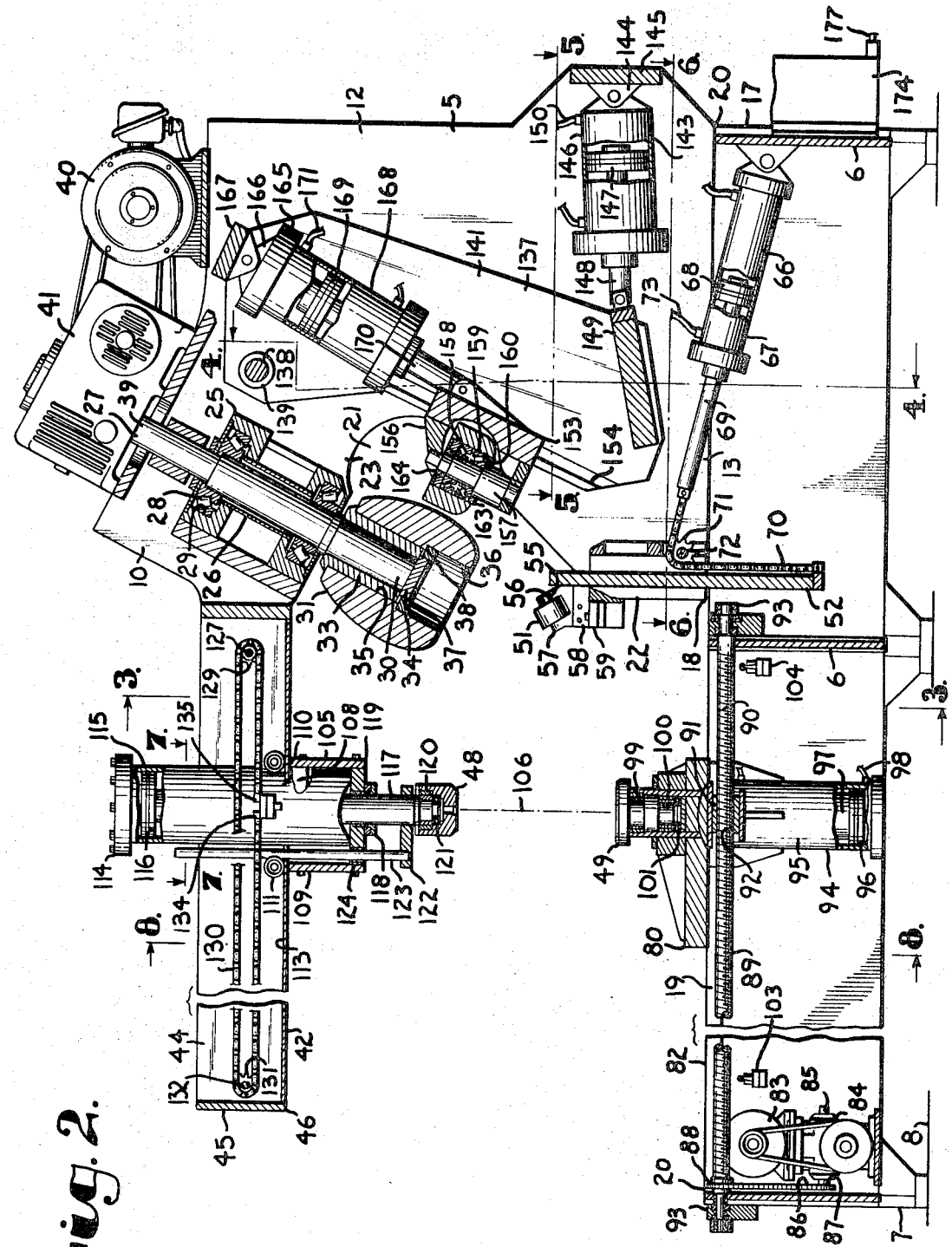

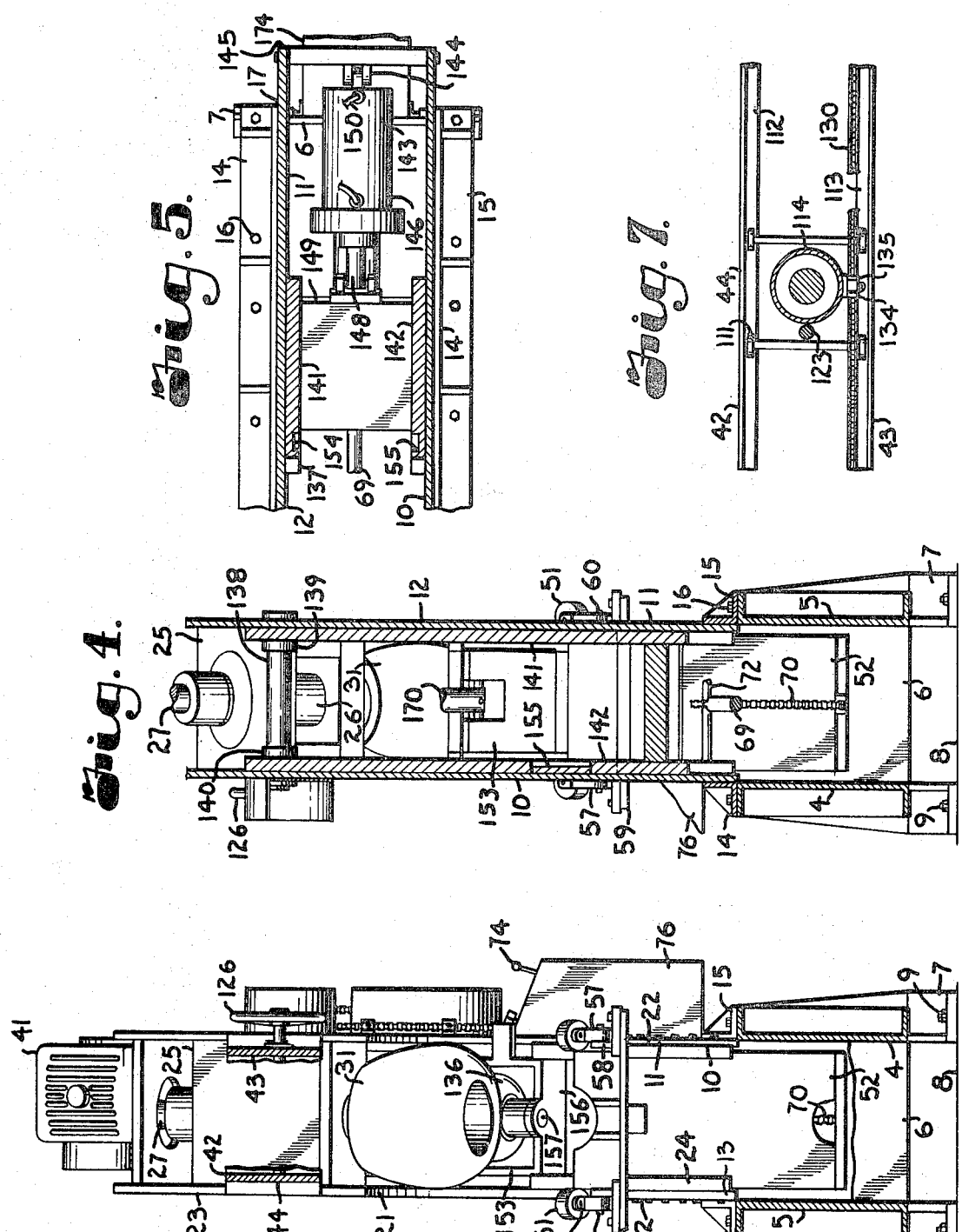

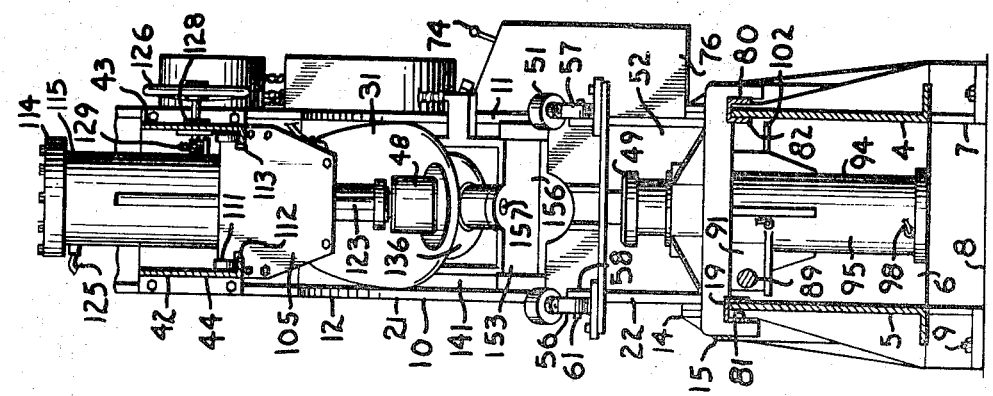

3,548,622
METAL PLATE FLANGING APPARATUS
Wayne E. Willard, Independence, Mo., assignor to Blue Valley Machine and Manufacturing Company, Kansas City, Mo., a corporation of Missouri
Filed July 8, 1968, Ser. No. 743,226
Int. Cl. B21d 22/18
U.S. Cl. 72—81                          10 Claims

ABSTRACT OF THE DISCLOSURE

An apparatus for flanging work pieces, such as flat metal plates or dish heads, with the apparatus having opposed adjustable rotatable work piece retaining upper and lower shoes for engaging an upper and lower surface of the workpiece respectively at the center thereof; adjustable side supports for engaging the lower surface of the work piece while permitting rotation thereof; a shaping roller having an exterior surface or outline conforming to a desired internal flange configuration of the work piece; a bending member engageable with the lower surface of the work piece at points opposed to the exterior surface of the shaping roller; power apparatus operative to effect rotation of the work piece; actuator devices operatively connected to the bending member mounting for moving same to change the point of engagement of the bending member with the work piece lower surface; and a trancer having a contact movable along a tracer pattern corresponding to the desired flange configuration of the work piece for operating the actuator devices.

---

This invention relates to improvements in metal plate flanging machines and more particularly to apparatus for flanging or otherwise forming marginal portions of plates, such as tank bottoms, heads, and the like.

The principal objects of the present invention are: to provide apparatus for flanging metal plates and apparatus operative in response to a tracer for moving a bending member or roller in spaced relation to a shaping roller to form the plate margin in a shape conforming to the exterior surface of the shaping roller; to provide such apparatus having automatic adjustment of the bending member in spaced relation to the shaping roller exterior surface; to provide such apparatus for holding the work piece substantially horizontal; to provide such apparatus which is quickly adjustable for flanging or forming marginal portions of circular work pieces, such as flat plates or dished heads, of different thickness and diameter and of different radii of dish from flat to standard dish heads where the radius of the dish is equal to diameter of the head; to provide such apparatus for turning a flange or marginal portion to stand at different angles with different radii of bend without distorting the body or flange as to gauge or thickness and without weakening the metal during bending or forming; to provide such apparatus with mechanisms for rotatably supporting the work piece on an axis that is substantially vertical and movable horizontally relative to the forming rollers for different diameter and radii of dish of heads; to provide such supporting mechanisms with movable clamping members to be quickly moved to work piece clamping and supporting position and to releasing position for facilitating changing of work pieces being formed; to provide such apparatus with the bending roller supported on a segment movable to cause the bending roller to bend a work piece against a shaping roller wherein the segment is movable to shift the bending roller toward and away from the shaping roller to change the angle of engagement of the bending roller with the work piece; to provide such apparatus in which the work piece is revolved automatically through engagement with a power rotated shaping roller; and to provide such apparatus for flanging or forming a marginal portion of a circular plate or dished head with fluid actuators and shifting mechanisms for ease and speed of movement of the parts and control thereof and that is efficient and positive in accurate forming operation.

Other objects and advantages of this invention will become apparent from the following description taken in connection with the accompanying drawings wherein are set forth by way of illustration and example certain embodiments of this invention.

FIG. 1 is a side elevation of a metal plate flanging machine constructed in accordance with the present invention shown in position for flanging a dished head, portions of which are broken away to illustrate the position of parts engaging same.

FIG. 2 is a vertical sectional view through the metal plate flanging machine.

FIG. 3 is a transverse vertical sectional view through the machine taken on line 3—3, FIG. 2.

FIG. 4 is a transverse vertical sectional view through the machine taken on line 4—4, FIG. 2.

FIG. 5 is a partial horizontal sectional view through the machine taken on line 5—5, FIG. 2.

FIG. 6 is a partial horizontal sectional view through the machine taken in line 6—6, FIG. 2.

FIG. 7 is a partial horizontal sectional view through the machine and taken on line 7—7, FIG. 2.

FIG. 8 is a vertical sectional view through the machine taken on line 8—8, FIG. 2 showing the metal plate supporting structure.

FIG. 9 is an enlarged elevational view of a tracer and pattern for positioning the flange forming members.

Referring more in detail to the drawings:

The reference numeral 1 generally designates a metal plate bending or flanging machine constructed in accordance with the present invention and which is particularly adapted for flanging or forming the marginal edge portion of work-pieces 2, such as those used in forming flat or crowned bottoms and heads of tanks and the like.

The flanging machine 1 includes a base 3 having spaced apart elongate structural members, such as beams or channels 4 and 5, adapted to be mounted on a floor or foundation. The elongate structural members 4 and 5 are connected together by suitable transverse members, such as walls or plates 6, which in the illustrated structure, are placed at each end of the base 3 and at least one wall or plate 6 is placed intermediate the ends thereof thereby forming a rigid base structure. A plurality of floor pads 7 are secured to a lower edge of the base 3 for supporting the flanging machine 1 on a suitable foundation 8 or the flanging machine 1 may be supported directly on a floor. In the illustrated structure, the floor pads 7 are positioned to align with the walls or plates 6 thereby increasing the rigidity of the structure. Suitable anchor bolts 9 are embedded in the floor or foundation 8 to secure the machine 1 in place.

The machine includes an upstanding portion or frame 10 on the base 3 and suitably secured thereto. In the illustrated structure, the upstanding portion is formed by spaced apart side plates 11 and 12 having lower edges 13 thereof resting on upper faces or edges of the structural members 4 and 5. The side plates 11 and 12 each have an elongate foot, in the form of a structural member such as an angle 14, suitably secured to the outer faces thereof, as by welding, and the angles 14 each have an outwardly extending leg or flange 15 resting on the upper face of the respective structural members 4 and 5 and suitably secured thereto, as by bolts 16. The side plates 11 and 12 each extend longitudinally from one end 17 of the base 3 to a point 18 intermediate the ends thereof. A lower guide rail structure 19 rests on the upper face of structural members 4 and 5 and extends from point 18 adjacent the side plates 11 and 12 to an opposite end 20 of the base 3. The lower guide rail structure 19 is of substantial length whereby relatively large diameter work pieces 2 may be accommodated, as later described.

The side plates 11 and 12 each have an open mouth 21 extending therein from a forward edge 22 which is adjacent point 18 and the lower guide rail structure 19. The mouth 21 is in upwardly spaced relation from the rail structure 19 whereby the side plates 11 and 12 each have upper and lower portions or arms 23 and 24 respectively extending forwardly from the rear of the mouth 21.

A housing 25 is mounted between the upper arms 23 of the side plates 11 and 12 and is suitably secured thereto, as by welding, to provide a rigid structure and maintain positive spacing between the upper arms 23. The housing 25 has an elongate bore 26 through which a shaft 27 extends. The shaft 27 is rotatably carried by suitable bearings, preferably anti-friction type such as tapered roller bearings 28, mounted in counter bores 29 extending inwardly from opposite ends of the housing 25. The shaft 27 is inclined downwardly toward the opening to the mouth 21 and has a lower end 30 on which a shaping roller 31 is mounted for rotation with the shaft 27.

The shaping roller 31 is particularly adapted for use in flanging or forming marginal portions 32 of the respective workpieces 2, such as dished heads of pressure vessels. The shaping roller 31 is removably mounted on the lower end 30 of the shaft 27 and may be replaced by other forms for particular operations and shapes of the flanges or marginal portions 32, the exterior surface of the selected shaping roller 31 being of a longitudinal outline conforming to the desired configuration of the finished marginal edge portion 32 of the respective workpiece 2.

In the illustrated structure, a hub 33 is removably mounted on the lower end 30 of the shaft 27 with a retainer 34 for holding same thereon. The shaping roller 31 has an elongate bore 35 extending longitudinally therethrough and adapted to engage the hub 33 in a relative tight fit. A counter-bore 36 in the shaping roller 31 receives a retainer 37 which is mounted on the hub retainer 34 and engages a shoulder 38 formed at the junction at the bore 35 and counter-bore 36 of the shaping roller 31.

The other or upper end 39 of the shaft 27 extends above the upper arms 23 and is operatively connected to a suitable drive means for imparting rotation thereto. In the illustrated structure, a drive motor 40 is operatively connected to a suitable gear reduction unit 41 which engages the upper end 39 of the shaft 27 thereby rotating the shaping roller 31 at a desired number of revolutions per minute.

An upper rail structure 42 is suitably fixed to the upper arms 23, as by being welded thereto, and extends outwardly therefrom over the lower rail structure 19 in vertically spaced parallel relation thereto. The upper rail structure 42, in the illustrated structure, consists of spaced apart structural members, such as channels 43 and 44. The upper rail structure 42 has cross members 45 extending between the channels 43 and 44 at the end fixed at the upper arms 22 and at a free end 46.

The workpiece 2 may be in the form of a circular flat plate, or a dished head with the axial center portion 47 of the work piece 2 gripped between rotatable upper and lower rail structures 42 and 19 respectively whereby the marginal edge portion 32 to be bent is positioned to extend into the mouth 21 beyond the shaping roller 31.

A lower or exterior surface 50 of the respective workpiece 2 is supported on at least one support roller 51 and preferably a pair of spaced rollers 51 carried by a block or frame 52 that is slidable vertically in guides or ways formed by slots 53 and 54 formed in the lower arms 24 of the side plates 11 and 12 respectively and extending downwardly from the mouth 21 and positioned adjacent the forward edge 22. The support roller 51 is rotatably mounted by anti-friction bearings 55 on a suitable spindle 56 which is fixed on a tiltable or rockable bracket 57. The bracket 57 is supported on a base 58 which is fixedly mounted on a support 59 which is secured to the block or frame 52. In the illustrated structure, a pair of spaced bases 58 each support a support roller 51 with each base 58 having spaced pins 60 and 61 extending outwardly therefrom through arcuate slotted openings 62 and 63 respectively in each bracket 57, thereby limiting the travel of the respective support roller 51 to the arcuate path of the slotted openings 62 and 63. Each base 58 has a curved upper edge 64 positioned to be engaged by and guide a curved lower edge 65 of the respective bracket 57. The position of the support rollers 51 along the arcuate path is determined by the shape of the lower or exterior surface 50 of the respective workpiece 2. The brackets 57 are movable between a position substantially vertical when the support rollers 51 engage a flat plate and a position inclined to the vertical when engaging dished heads having relatively short radius of dish.

An operating member or extensible member 66 is operatively connected with the block or frame 52 to raise and lower same. The extensible member 66 consists of a cylinder 67 carried between the structural members 4 and 5 of the base 3 and having one end suitably secured to one of the walls 6, as for example pivotally mounted on the wall 6 at the one end 17 of the base 3. A piston 68 is reciprocable in the cylinder 67 and has a piston rod 69 that extends through an upper end of the cylinder 67 with the upper end of the rod 69 being operatively connected to the block or frame 52. In the illustrated structure, a suitable flexible connecting member, such as a chain 70, has one end secured to the piston rod 69 and the other end secured to the block or frame 52. In the illustrated structure, the cylinder 67 is inclined and block or frame 52 is vertical therefore the chain 70 must engage a suitable direction changing member, such as an idler sprocket 71 which is mounted on an idler shaft 72 extending between the side plates 11 and 12 of the upstanding portion 10 and is rotatably supported in suitable bearings or bushings mounted therein. The chain 70 engages the idler sprocket 71 intermediate its ends to change the direction of the force exerted by the extensible member 66 to raise and lower the support rollers 51 thereby rotatably supporting the respective workpiece 2. In the illustrated structure, withdrawing the piston rod 69 into the cylinder 67 raises the support rollers 51 and extending the piston rod 69 lowers the support rollers 51.

Suitable fluid, such as hydraulic fluid, under pressure is applied to the upper end of the cylinder 67 through suitable tubing 73 under control of a lever 74 which is operatively connected to a suitable control valve 75 positioned in a control panel 76 mounted on the upstanding portion 10 whereby when fluid pressure is introduced into the upper end of the cylinder 67 the piston 68 and the piston rod 69 are withdrawn into the cylinder 67 to raise the block or frame 52 and the support rollers 51 into engagement with the lower or exterior surface 50 of a workpiece 2 to be formed. The support rollers 51 thereby effect a gripping engagement between the workpiece 2 and the shaping roller 31. The support rollers 51 are shown as having a cylindrical periphery. However, it is to be understood that rollers having a beveled or curved surface or other suitable shape may be substituted for the cylindrical rollers to accommodate the particular workpiece 2 to be formed.

The support rollers 51 cooperate with an upper center member 48, and a lower center member 49 to rotatably support the workpiece 2 whereby same is rotated through engagement with the shaping roller 31. The upper center member 48 and the lower center member 49 are adjustable vertically, as later described, to position the workpiece 2 to be clampingly engaged by the support rollers 51 and the shaping roller 31.

The circular workpieces 2 may vary in diameter and may vary from flat pieces to heads of various dish shape. It is therefore necessary that the position of the axial center portion 47 of the respective workpiece 2 relative to the shaping roller 31 be adjusted along the respective upper and lower rail structure 42 and 19 respectively to accommodate the diameter of the particular workpiece.

The lower center member of shoe 49 is rotatably mounted in a lower carriage 80 having guides or ways 81 slidably engaging the lower guide rail structure 19 which is in the form of rails or tracks 82 suitably secured on the upper face of the structural member 4 and 5, as by welding. In the illustrated structure, the lower carriage 80 is movable longitudinally along the rails or tracks 82 by suitable power means, such as a reversible motor 83 which is mounted between the structural members 4 and 5 adjacent the opposite end 20 thereof. The reversible motor 83 is operatively connected to a suitable gear reduction unit 84 which rotates a stub drive shaft 85 extending outwardly therefrom toward the wall or plate 6 mounted at the opposite end 20. The stub drive shaft 85 is operatively connected to the lower carriage 80 to move same longitudinally along the lower guide rail structure 18. The connection in the illustrated structure includes a suitable flexible connecting member, such as an endless chain 86, engaging a suitable drive member, such a a drive sprocket 87 mounted on the free end of the stub drive shaft 85 and a power transmitting sprocket 88 mounted on an elongate drive member 89. The drive member 89 is illustrated as an elongate shaft having a screw flight 90 which is engaged by a drive sleeve or nut 91 mounted within the lower carriage 80 with the drive sleeve or nut 91 having an internally threaded bore 92 adapted to engage the screw flight 90. Opposite ends of the drive member 89 are rotatably supported in suitable bearings, such as needle bearings 93, mounted in the wall or plate 6 at the opposite end 20 of the base 3 and in an intermediate wall or plate 6 positioned adjacent the point 18 and spaced therefrom to be cleared by the block or frame 52 during raising and lowering of the support rollers 51.

A lower extensible member 94 is mounted within the lower carriage 80 and is operatively connected to the lower center member 49 to raise and lower same. The lower extensible member 94, in the illustrated structure, consists of a cylinder 95 having a piston 96 reciprocable therein with a piston rod 97 extending through the upper end of the cylinder 95 and connected to the lower center member 49. Suitable fluid, such as air, under pressure is applied to the lower end of the cylinder 95 by a suitable hose or tube 98 under control of a suitable remote controlled air valve (not shown) whereby when fluid pressure is introduced into the lower end of the cylinder 95 the piston 96 and the piston rod 97 are moved upwardly to raise the lower center member or shoe 49 and a workpiece 2 positioned thereon into a position engaging the shaping roller 31.

The piston rod 97 is guided within the lower carriage 80 by suitable spaced bearings, such as upper and lower needle bearings 99 and 100 respectively. The piston rod 97 is adapted to resist downward thrust exerted by the upper center member 48 by placing a suitable thrust bearing 101 in a position to be contacted by the lower edge of the lower needle bearing 100.

In the illustrated structure, travel of the lower carriage 80 along the rails or tracks 82 is limited to travel between suitable limits such as the point 18 and the opposite end 20 of the base 3 as by mounting a limit switch trip 102 on the lower carriage 80 or on the lower cylinder 95 in a position to engage suitable limit switches 103 and 104 mounted at opposite ends of the desired travel of the lower carriage 80 along the lower rail structure 19.

The upper center member or shoe 48 is mounted on an upper carriage 105 which is movable longitudinally of the upper rail structure 42 to align the upper center member 48 on an axis 106 extending upwardly through the piston rod 97 and the lower center member 49 mounted thereon and the axial center portion 47 of the workpiece 2. The upper and lower center members 48 and 49 thereby cooperate to hold a respective workpiece 2 in a substantially horizontal position for rotation about the axis 106.

In the illustrated structure, the upper carriage 105 consists of side plates 107 and 108 vertically aligned with and positioned below the channel members 43 and 44 respectively and end plates 109 and 110 positioned at and extending between opposite ends of the side plates 107 and 108. Rotatably mounted rollers or wheels 111 extend upwardly from the end plates 109 and 110 and engage lower flanges 112 and 113 of the channel members 43 and 44 respectively thereby suspending the upper carriage 105 from the upper rail structure 42 for longitudinal movement therealong. In the illustrated structure, the lower flanges 112 and 113 are inwardly directed and the rollers or wheels 111 are positioned between the channel members 43 and 44 thereby protecting same from damage by accidental engagement by the workpiece 2 or other material.

An upper extensible member 114 is mounted within the upper carriage 105 and is operatively connected to the upper center member 48 to raise and lower same. The upper extensible member 114 is similar to the lower extensible member 94 and consists of an upper cylinder 115 having an upper piston 116 reciprocable therein and an upper piston rod 117 that extends through a lower end of the upper cylinder 115 with the lower end of the upper piston rod 117 rotatably supporting the upper center member 48. The piston rod 117 is guided within the upper carriage 105 by a suitable bushing 118 mounted in a bushing housing 119 extending between lower ends of the end plates 109 and 110. The bushing 118 is slidably engaged by the upper piston rod 117 to guide same during extension and retraction thereof.

The upper center member 48 is rotatably mounted on the lower end of the upper piston rod 117 by means of suitable bearings, such as needle bearings 120 similar to the needle bearings 99 and 100. A thrust bearing 121, similar to the thrust bearing 101, is positioned to resist thrust between the upper and lower extensible members 114 and 94, thereby providing long life and reduced friction for the rotatable mounting of the upper and lower center members 48 and 49. A suitable guide yoke 122 is mounted on the upper piston rod 117 adjacent the lower end thereof and is movable therewith. An upright member 123 extends upwardly from the guide yoke 122 and through the upper carriage 105 through a suitable bushing 124 mounted in the bushing housing 119. Suitable fluid, such as air, under pressure is applied to the upper end of the cylinder 115 by a suitable hose or tube 125 under control of a suitable control valve (not shown) whereby when fluid pressure is introduced into the upper end of the cylinder 115 the piston 116 and the piston rod 117 are moved downwardly to engage the upper center member 48 with the axial center portion 47 of the respective workpiece 2.

The upper center member 48 is aligned with the axis 106 by manually moving the upper carriage 105 longitudinally along the upper rail structure 42. In the illustrated structure, a hand wheel 126 is operatively connected to the upper carriage 105 to move same longitudinally along the upper rail structure 42. The hand wheel 126, in the illustrated structure, is mounted on the upper rail structure 42 adjacent the fixed end. A stub drive shaft 127 extends transversely through one of the channel members, as for example channel 43, and is rotatably supported in a suitable bearing or housing 128 mounted therein with the hand wheel 126 mounted on one end of the drive shaft 127 and a suitable power transmitting member, such as a drive sprocket 129, mounted on the other end of the stub drive shaft 127 and between the channels 43 and 44. A suitable flexible connecting member, such as a chain 130, has opposite ends secured to the housing of the upper cylinder 115 and is operatively connected to the drive sprocket 129 and to an idler sprocket 131 rotatably mounted in the channel member 43 adjacent the free end 46 of the upper rail structure 42. In the illustrated structure, the idler sprocket 131 is mounted on an idler shaft 132 which is rotatably supported in a suitable bearing or housing 133 mounted in the channel member 43 adjacent the free end 46 thereof. In the illustrated structure, suitable chain tighteners 134 and 135 are mounted on the housing of the upper cylinder 115 and are connected to the opposite ends of the chain 130 for adjusting the tension therein.

Rotation of the hand wheel 126 moves the upper cylinder 115 and thereby the upper carriage 105 longitudinally along the upper rail structure 42 through the rollers or wheels 111 traveling along the lower flanges 112 and 113 of the channels 43 and 44.

A bending or flanging roller 136 is located between the side plates 11 and 12 and is movably mounted relative to the open mouth 21 and the exterior surface of the shaping roller 31. The bending or flanging roller 136 is adapted to be movel parallel with the exterior surface of the shaping roller 31 and adapted to grippingly engage the marginal edge portion 32 of the respective workpiece 2 in cooperation with the shaping roller 31.

In the illustrated structure, the bending or flanging roller 136 is movable longitudinally of an elongate segment 137 which is swingingly mounted relative to the side plates 11 and 12. A rocker shaft 138 has opposite ends rotatably supported in suitable bushings 139 and 140 in the side plates 11 and 12 respectively at the upper arms 23. An upper end of the segment 137 is mounted on the rocker shaft 138 and is positioned between the side plates 11 and 12. In the illustrated structure, the segment 137 consists of spaced apart plates 141 and 142 which are positioned adjacent the side plates 11 and 12 respectively.

An extensible member 143 is operatively connected to the segment 137 to swing the segment in an arcuate path about the rocker shaft 138 and thereby move the bending roller 136 toward and away from the shaping roller 131. One end of the extensible member 143 is pivotally mounted on a support 144 which is illustrated as a plate extending between and secured to the side plates 11 and 12 at a rear edge 145 of the upstanding portion 10. The extensible member 143 consists of a cylinder 146 carried between the side plates 11 and 12 having a piston 147 reciprocable therein. A piston rod 148 extends through the other end of the cylinder 146 with the piston rod 148 being operatively connected to the segment 137. In the illustrated structure, a connection plate 149 extends between the lower ends of the segment plates 141 and 142. The piston rod 148 is suitably pivotally connected to the connection plate 149 to thereby permit the piston rod 148 to move in a linear path while urging the segment 137 in an arcuate path about the rocker shaft 138.

Suitable fluid, such as hydraulic fluid, under pressure is applied to the forward or rear ends of the cylinder 146 alternately through suitable tubing 150 under control of a lever 151 which is operatively connected to a suitable control valve 152 positioned in the control panel 76, whereby when fluid pressure is introduced into the rear end of the cylinder 146 the piston 147 and the piston rod 148 are extended outwardly from the cylinder 146 to swing the segment 137 away from the rear edge 145 and toward the forward edge 22, thereby moving the bending or flanging roller 136 toward the shaping roller 131. Introducing fluid pressure into the forward end of the cylinder 146 moves the bending roller 136 toward the rear edge 145.

The bending roller 136 is mounted on a support frame 153 which is movable relative to the segment 137 in linear guides or ways 154 and 155 extending longitudinally in the segment plates 141 and 142 respectively. A bracket 156 extends outwardly from the support frame 153 to provide support for a shaft 157 extending upwardly therefrom. The bending roller 136 is rotatably mounted on the shaft 157 by suitable bearings, such as upper and lower tapered roller bearings 158 and 159 respectively. In the illustrated structure, the bending roller 136 has a bore 160 extending longitudinally therethrough with counter-bores 161 and 162 at opposite ends of the bore 160. The shaft 157 has a portion having a reduced diameter with the roller bearings 158 and 159 mounted thereon. The bore 160 of the bending roller 136 engages the bearings 158 and 159. Suitable retainers 163 are mounted in the counter-bores 161 and 162 to retain the bending roller 136 on the shaft 157 and to retain a suitable seal member, such as an O-ring, in engagement with the shaft 157. Suitable shaft nuts 164 are mounted on the free end of the shaft 157 and engage the retainer 163 in the upper counter-bore 161. The bending roller 136 is thereby adapted to be removed and replaced by another bending roller having a different exterior surface configuration depending on the workpiece shape and size of the marginal edge portion 32 being formed.

An extensible member 165 is operatively connected to the support frame 153 to move same and the bending roller 136 mounted thereon longitudinally along the ways 154 and 155 in a linear path relative to the segment 137. The extensible member 165 has an upper end 166 pivotally mounted on a fixed support member 167 which is illustrated at a plate adjacent the upper end of the segment 137 and extending between the segment plates 141 and 142. The extensible member 165 consists of a cylinder 168 carried between the segment plates 141 and 142 and has a piston 169 reciprocable therein with a piston rod 170 that extends downwardly through the lower end of the cylinder 168. The piston rod 170 is pivotally connected to the support frame 153 at the lower end of the piston rod 170 to thereby permit the piston rod 170 to move at an angle with the longitudinal ways 154 and 155.

Suitable fluid, such as hydraulic fluid, under pressure is applied to the upper or lower ends of the cylinder 168 through the suitable tubing 171 under control of a lever 172 which is operatively connected to a suitable control valve 173 positioned in the control panel 76, whereby when fluid pressure is introduced into the upper end of the cylinder 168 the piston 169 and the piston rod 170 are extended from the cylinder 168 to lower the frame 153 and when fluid pressure is introduced into the lower end of the cylinder 168 the piston 169 and the piston rod 170 are withdrawn into the cylinder 168 to raise the support frame 153 within the guides or ways 154 and 155.

The extensible members 143 and 165 cooperate to position the bending roller 136 to clampingly engage the marginal edge portion 32 between the shaping roller 31 and the bending roller 136 and to move the bending roller 136 longitudinally of and parallel with the exterior surface of the shaping roller 31 while clampingly engaging the marginal portion 32 thereby bending same to conform to the longitudinal outline of the exterior surface of the shaping roller 31.

The fluid for use in activating the hydraulic extensible members 66, 143 and 165 is preferably contained in a tank or reservoir 174 supported on the base 3 at the one end 17 and the fluid is withdrawn therefrom by an appropriate pump 175 driven by a suitable motor 176 to supply fluid under pressure through suitable tubing 177 to the valves 75, 152 and 173 for selectively supplying fluid pressure to the respective ends of the cylinders of the respective extensible members and permitting return flow of the fluid through suitable tubing 178 to the tank or reservoir 174.

An appropriate source of compressed air (not shown) is operatively connected to the extensible members 94 and 114 to supply compressed air to the cylinders 95 and 115 under control of suitable air valves (not shown) which are controlled by levers 179 and 180 respectively. It is preferred that the lever 179, controlling the lower extensible member 94, be mounted in the control panel 76 and the lever 180 may also be mounted in the control panel 76 or mounted on the upper rail structure 142 adjacent the hand wheel 126.

When a workpiece 2 in the form of a dished head is to be formed the levers 74, 151, 172, 179 and 180 are manipulated to lower the support rollers 51, swing the segment 137 away from the mouth 21, lower the support frame 153 with the bending roller 136 thereon, lower the lower center member 49, and raise the upper center member 48 respectively. The dished head is then placed on the lower center member 49 with its axial center portion 47 aligned on the axis 106. The upper center member 48 is then aligned with the axis 106 whereby the lower piston rod 97 and the upper piston rod 117 are coaxial with the axis 106. After the workpiece 2 is properly positioned relative to the shaping roller 31 the levers 179 and 180 are manipulated to raise the lower center member 49 to engage the marginal portion 32 with the shaping roller 31 and to lower the upper center member 48 into engagement with the axial center portion 47 of the workpiece 2 respectively thereby supporting the workpiece 2 for rotation about the axis 106. The lever 74 is then manipulated to raise the support rollers 51 into engagement with the lower or exterior surface 50. The levers 151 and 172 are then manipulated to move the bending roller 136 to clampingly engage the marginal portion 32 between the shaping roller 31 and the bending roller 136. The control valve 75 is operative to maintain the support rollers 51 in positive engagement with the head during forming operations without further upward movement of the support rollers 51 thereby preventing the rollers 51 marring or pressing into the head.

In the bending operation, the motor 40 is energized to roate the shaft 27 and drive the shaping roller 31 mounted on the shaft 27 whereby engagement of the shaping roller 31 with the marginal portion 32 rotates the workpiece on the axis 106. Then the levers 151 and 172 are manipulated to control the movement of the bending roller 136 relative to the longitudinal outline of the exterior surface of the shaping roller 131. The levers 151 and 172 must be continually manipulated to move the bending or flanging roller 136 parallel with the longitudinal outline of the shaping roller exterior surface to obtain various angles of engagement of the bending roller 136 with the marginal portion 32 of the workpiece 2 to gradually bend and iron said marginal portion 32 upwardly until it forms a flange that is pressed flatly against the proximate or exterior face of the shaping roller 31.

The working of the marginal portion 32 provides an ironing out of wrinkles that may have occurred in dishing the head and provides a gradual bending to effect the flanging operation without buckling or wrinkling of the metal plate of the workpiece 2 whereby the flange will grow in length as it is bent up but the flange will not change thickness due to the bending roller 136 being moved parallel with the longitudinal outline of the shaping roller 31. While this operation provides a gradual ironing and bending to obtain a smooth forming and bending of a flange or the like, the operation is performed rapidly due to the ease with which the movement of the bending roller 136 is controlled by the movement of the segment 137 and the support frame 153 through the extensible members 143 and 165 and by the operator being able to watch the movements of the bending roller 136 relative to the work through the open mouth 21. After the workpiece 2 has been properly formed or flanged the extensible members 143 and 165 are actuated to swing the segment 137 away from the shaping roller 31 and retract the bending roller 136 therefrom and the fluid pressure in the cylinder 67 is released whereby the support rollers 51 are lowered a distance greater than the height of the finished marginal portion 32 of the workpiece. Then the levers 179 and 180 are manipulated to lower the workpiece and raise the upper center member 48 respectively thereby releasing the formed head for removal from the machine.

Suitable tracer means may be mounted on the machine 1 to position the bending or flanging roller 136 in spaced relation with the shaping roller 31 and to move the bending or flanging roller 136 longitudinally of and parallel with the longitudinal outline of the exterior surface of the shaping roller 31. The tracer means is operatively connected to the extensible member 143 to thereby control the movement of the segment 137 as the bending roller 136 is moved longitudinally and parallel with the longitudinal outline of the exterior surface of the shaping roller 31.

In the illustrated structure, a tracer 181 is movable along a pattern 182 having an edge profile 183 corresponding to the longitudinal outline of the exterior surface of the shaping roller 31. The pattern 182 is removably mounted on the upstanding portion 10 and the tracer 181 is movably mounted on an elongate arm 184 which is movable parallel with the upstanding portion 10. One end of the rocker shaft 138 extends outwardly from the upstanding portion 10 and the arm 184 is mounted thereon in spaced parallel relation with the upstanding portion 10. A tracer carriage 185 is mounted on the arm 184 and is adapted to be moved longitudinally therealong by means of suitable upper and lower carriage wheels 186 and 187 respectively being in engagement with the arm 184.

The tracer carriage 185 is operatively connected to an appropriate power means, such as an electric motor (not shown) for moving the tracer 181 along the pattern 182. In the illustrated structure, the motor (not shown) rotates a drive shaft 189 rotatably mounted in the arm 184 and having a suitable power transmitting member, such as a drive sprocket wheel 190, mounted on the free end of the shaft 189. A suitable flexible connecting member, such as a chain 191, has opposite ends secured to the tracer carriage 185. The chain 191 engages the drive sprocket wheel 190 and an idler sprocket wheel 192 with the sprocket wheels 190 and 192 being rotatably mounted adjacent opposite ends of the arm 184 with the tracer carriage 185 positioned between same. Suitable chain tightening means, such as an adjustable sprocket wheel 193 is rotatably mounted on the arm 184 beyond the limits of travel of the tracer carriage 185 and is engaged by the chain 191. The position of the sprocket wheel 193 is adjustable to maintain proper tension in the chain 191.

The tracer 181 includes an appropriate template follower, such as a tracer wheel 194 operatively connected to the extensible member 143 for positioning the bending or flanging roller 136 relative to the longitudinal outline of the shaping roller 31.

A removable rim or tire 195 is mounted on the tracer wheel 194 to space the tracer wheel 194 from the template edge profile 183 a selected distance preferably corresponding to the desired thickness of the marginal portion 32 of the workpiece 2. The thickness of the removable rim 195 thereby corresponds to and establishes the desired spacing between the shaping roller 31 and the bending roller 136.

The spacing between the shaping roller 31 and the bending roller 136 may be varied by mounting the template 182 on an adjustable bracket 196 which is adapted to adjust the template 182 toward and away from the tracer wheel 194 thereby varying the spacing between the shaping roller 31 and the bending roller 136 whereby the thickness of the marginal portion 32 may be greater or less than the thickness of the workpiece 2.

The arm 184 is suitably weighted to maintain a firm engagement between the rim 195 and the edge 183 of the template 182 thereby providing a smooth wrinkle-free marginal edge portion 32. In the illustrated structure, an appropriate counter-weight 197 is connected to one end of a suitable flexible connecting member, such as a chain 198, which engages an idler sprocket 199 rotatably mounted on the arm 184 with the other end of the chain 198 suitably secured to the support frame 153.

The tracer 181 includes a suitable follower valve 200 hydraulically connected to the tank or reservoir 174, pump 175, and the cylinder 146 of the extensible member 143. In the illustrated structure, a suitable fluid pressure line 201 extends between the follower valve 200 and the pump 175. A fluid supply line 202 is connected to the follower valve 200 and to the tank or reservoir 174 for receiving fluid under pressure therefrom and a fluid discharge line 203 is connected to the tank or reservoir 174 and to the follower valve 200 for return of fluid from the follower valve 200 to the tank or reservoir 174. The follower valve 200 is connected to opposite ends of the cylinder 146 by suitable fluid lines 204 and 205 thereby swinging the segment 137 as the tracer wheel 194 and rim 195 move along the template edge 183.

The operation of the flanging machine 1 with the tracer 181 is substantially similar to the operation thereof without the tracer 181 except that the quality of the marginal portions 32 of the respective workpiece 2 is surprisingly increased and the thickness of the marginal portion is maintained within desired tolerances. The tracer 181 also overridges the control valve 152 by means of the fluid lines 204 and 205.

It is to be understood that while I have illustrated and described one form of my invention, it is not to be limited to the specific form or arrangements of parts herein described except insofar as such limitations are included in the claims.

What I claim and desire to secure by Letters Patent is:

1. Apparatus for flanging an edge portion of plates comprising:
   (a) an elongate frame;
   (b) means carried by said elongate frame for selectively positioning a plate and retaining said plate in a selected position;
   (c) means for rotatably supporting said plate while in said selected position;
   (d) an elongate shaping roller having an exterior surface with a longitudinal outline conforming to a desired configuration of an edge portion of said plate and engaging a first surface of said plate edge portion at an area where said plate edge portion is to be bent;
   (e) a bending roller movable to engage a second surface of said plate edge portion at said bending area;
   (f) a rocker shaft pivotally mounted transverse of said frame;
   (g) a segment mounted on said rocker shaft for pivotal movement in said frame;
   (h) said bending roller being movably mounted on said segment;
   (i) means operatively connected to said segment and moving said bending roller to change the point of engagement of said bending roller with said plate second surface;
   (j) control means operatively connected to said bending roller moving means to effect positioning said bending roller relative to said shaping roller; and
   (k) tracer means operative to follow a guide and actuate said bending roller moving means to move the bending roller relative to the shaping roller exterior outline to form the plate edge portion therebetween.

2. The apparatus for flanging an edge portion of plates as set forth in claim 1 wherein said means moving said bending roller includes:
   (a) a support frame having said bending roller rotatably mounted thereon,
   (b) a way in said segment for guiding said support frame therein for movement therealong,
   (c) a first extensible member operative to move said support frame along said way relative to said segment, and
   (d) a second extensible member operatively connected to said segment for positioning said bending roller in spaced relation with said shaping roller.

3. Apparatus for flanging an edge portion of plates comprising:
   (a) means for selectively positioning a plate and retaining said plate in the selected position;
   (b) means for rotatably supporting said plate while in said selected position;
   (c) an elongate shaping roller having an exterior surface with a longitudinal outline conforming to a desired configuration of an edge portion of said plate and engaging a first surface of said plate edge portion at an area where said plate edge portion is to be bent;
   (d) a bending roller movable to engage a second surface of said plate edge portion at said bending area;
   (e) drive means rotating said plate;
   (f) an elongate frame;
   (g) a rocker shaft pivotally mounted transverse of said frame;
   (h) a segment mounted on said rocker shaft for pivotal movement in said frame;
   (i) said bending roller being movably mounted on said segment;
   (j) a way in said segment for guiding said support frame therein for movement therealong;
   (k) means moving said bending roller to change the point of engagement of said bending roller with said plate second surface and having a first extensible member connected to said segment and operatively to move the support frame along said way relative to said segment;
   (l) a second extensible member operatively connected to said segment for positioning said bending roller in spaced relation with said shaping roller;
   (m) control means operatively connected to said means moving said bending roller to effect positioning said bending roller relative to said shaping roller;
   (n) tracer means operative to follow a guide and actuate said bending roller moving means to move the bending roller relative to the shaping roller exterior outline to form the plate edge portion therebetween;
   (o) said tracer means including an elongate tracer arm mounted on said rocker shaft;
   (p) a tracer template having an edge corresponding in shape to said shaping roller exterior outline;
   (q) a tracer wheel movably mounted on said arm for engaging and traveling along said tracer template edge; and
   (r) valve means communicating with said second extensible member and responsive to travel of said wheel along said tracer template edge thereby positioning said bending roller in spaced relation to said shaping roller exterior outline.

4. The apparatus for flanging an edge portion of plates as set forth in claim 3 including:
   (a) a counterweight;
   (b) wheel means rotatably mounted on said tracer arm; and
   (c) an elongate flexible connecting member having one end connected to said counterweight and the other end connected to said support frame, said flexible connecting member engaging said wheel means intermediate the ends of said flexible connecting member whereby said tracer wheel is held in firm engagement with said tracer template edge.

5. The apparatus for flanging and edge portion of plates as set forth in claim 3 including:
   (a) a rim mounted on said tracer wheel, said rim having a thickness proportional to a desired spacing between said shaping roller and said bending roller; and
   (b) a bracket mounted on said elongated frame and having said tracer template mounted thereon, said bracket being adjustable to vary said spaced relation between said bending roller and said shaping roller.

6. Apparatus for flanging an edge portion of plates comprising:
  (a) means for selectively positioning a plate and retaining said plate in the selected position;
  (b) means for rotatably supporting said plate while in said selected position;
  (c) an elongate shaping roller having an exterior surface with a longtudinal outline conforming to a desired configuration of an edge portion of said plate and engaging a first surface of said plate edge portion at an area where said plate edge portion is to be bent;
  (d) a bending roller movable to engage a second surface of said plate edge portion at said bending area;
  (e) drive means rotating said plate;
  (f) an elongate frame;
  (g) a rocker shaft pivotally mounted transverse of said frame;
  (h) a segment mounted on said rocker shaft for pivotal movement in said frame;
  (i) said bending roller being movably mounted on said segment;
  (j) a way in said segment for guiding said support frame therein for movement therealong;
  (k) means moving said bending roller to change the point of engagement of said bending roller with said plate second surface and having a first extensible member connected to said segment and operatively to move the support frame along said way relative to said segment;
  (l) said way being linear and the movement of said bending roller support frame therealong being linear relative to said segment;
  (m) a second extensible member operatively connected to said segment for positioning said bending roller in spaced relation with said shaping roller;
  (n) said second extensible member having a piston rod pivotally connected to said segment whereby said segment swings in an arcuate path about said rocker shaft;
  (o) control means operatively connected to said means moving said bending roller to effect positioning said bending roller relative to said shaping roller; and
  (p) tracer means operative to follow a guide and actuate said bending roller moving means to move the bending roller relative to the shaping roller exterior outline to form the plate edge portion therebetween.

7. Apparatus for flanging and edge portion of plates comprising:
  (a) an elongate frame;
  (b) means carried by said elongate frame for selectively positioning a plate and retaining said plate in a selected position;
  (c) means for rotatably supporting said plate while in said selected position;
  (d) an elongate shaping roller having an exterior surface with a longitudinal outline conforming to a desired configuration of an edge portion of said plate and engaging a first surface of said plate edge portion at an area where said plate edge portion is to be bent;
  (e) a bending roller movable to engage a second surface of said plate edge portion at said bending area;
  (f) a rocker shaft pivotally mounted transverse of said frame;
  (g) a segment mounted on said rocker shaft for pivotal movement in said frame;
  (h) said bending roller being movably mounted on said segment;
  (i) means operatively connected to said segment and moving said bending roller to change the point of engagement of said bending roller with said plate second surface;
  (j) control means operatively connected to said bending roller moving means to effect positioning said bending roller relative to said shaping roller;
  (k) tracer means operative to follow a guide and actuate said bending roller moving means to move the bending roller relative to the shaping roller exterior outline to form the plate edge portion therebetween;
  (l) said frame having an elongate lower rail and an elongate upper rail and an upstanding portion mounted at one end of said lower rail, said upper rail being fixedly mounted on said upstanding portion and in spaced parallel relation and in vertical alignment with said lower rail;
  (m) said plate retaining means being an upper shoe movable longitudinally of said upper rail and a lower shoe movable longitudinally of said lower rail, said upper shoe being extendable substantially transversely of said upper rail;
  (n) said upper shoe is operatively connected to an air cylinder operated independently of said first and said second hydraulic cylinders, said air cylinder being operative to extend and retract said upper shoe;
  (o) said lower shoe is movable independently of said upper shoe;
  (p) a carriage rotatably supporting said upper shoe, said carriage being movable along said upper rail;
  (q) said carriage having portions engageable with said upper rail in response to force of said air cylinder acting on said upper shoe to clamp the plate between said upper and lower shoes, said engagement of the carriage portions with sail upper rail holding the carriage against movement while the plate is clamped between said upper and lower shoes.

8. Apparatus for flanging an edge portion of dished heads having an interior surface and an exterior surface, said apparatus comprising:
  (a) an elongate frame having a lower rail and an upstanding portion fixedly mounted on one end of said lower rail and an upper rail fixedly mounted on said upstanding portion and extending outwardly in a spaced parallel and vertically aligned relation with said lower rail;
  (b) axially alignable rotatable upper and lower shoes movably mounted on said upper rail and said lower rail, respectively, for engaging an interior and exterior surface of a dished head, respectively, said upper shoe being movable longitudinally along said upper rail independently of said lower shoe;
  (c) power means for extending and retracting said upper shoe transversely of said upper rail;
  (d) rotatably mounted support rollers movably mounted relative to said frame for engaging said dished head exterior surface for rotatable support thereof,
  (e) a rotatably mounted shaping roller having an exterior surface with a longitudinal outline conforming to a desired configuration of an edge portion of said dished head for engaging said dished head interior surface at a bending area where said dished head edge portion is to be bent;
  (f) rotatably mounted bending roller movably mounted relative to said shaping roller for engaging said dished head exterior surface at said bending area;
  (g) drive means for rotating said shaping roller thereby rotating said dished head;
  (h) power means for moving said bending roller to change the point of engagement of said bending roller with said dished head exterior surface;
  (i) tracer means operative to follow a guide and activate said power means to move said bending roller relative to said shaping roller exterior surface outline to form the dished head edge portion therebetween;
  (j) said power moving means including a rocker shaft mounted on said upstanding portion of said frame, said rocker shaft being transverse of said frame;
(k) a segment mounted on said rocker shaft for pivotal movement within said upstanding portion;
(l) a linear way mounted on said segment for guiding said bending roller;
(m) said bending roller being mountd on a support frame;
(n) said bending roller support frame traveling in a linear relation to said segment;
(o) a first hydraulic cylinder having a rod operatively connected to said bending roller support frame for moving said bending roller support frame along said way;
(p) a second hydraulic cylinder having a rod operatively connected to said segment for positioning said segment and said bending roller in spaced relation to said shaping roller exterior surface outline, said second hydraulic cylinder rod being pivotally connected to said segment whereby said segment is swingable in an arcuate path about said rocker shaft;
(q) control means operatively connected to said first and said second hydraulic cylinders.

9. The apparatus for flanging an edge portion of dished heads as set forth in claim 8 including:
(a) guide means mounted in said upstanding portion of said frame;
(b) said support rollers being movably mounted in said guide means; and
(c) a third hydraulic cylinder operatively connected to said support rollers for positioning said support rollers to rotatably supporting said dished head exterior surface.

10. Apparatus for flanging an edge portion of plates comprising:
(a) an elongate frame;
(b) means for selectively positioning a plate and retaining said plate in a selected position;
(c) means for rotatably supporting said plate while in said selected position;
(d) an elongate shaping roller having an exterior surface with a longitudinal outline conforming to a desired configuration of an edge portion of said plate and engaging a first surface of said plate edge portion at an area where said plate edge portion is to be bent;
(e) a segment mounted in said frame for pivotal movement;
(f) a support movably mounted on said segment;
(g) a bending roller movable to engage a second surface on said plate edge portion at said bending area;
(h) drive means rotating said plates;
(i) a first extensible member connected to said segment and operatively to move said support on said segment to change the point of engagement of said bending roller with said plate second surface;
(j) a second extensible member operatively connected to said segment for positioning said bending roller in spaced relation with said shaping roller;
(k) tracer means operative to follow a guide and actuate said bending roller moving means to move the bending roller relative to the shaping roller exterior outline to form the plate edge portion therebetween;
(l) said tracer means including an elongate tracer arm mounted for pivotal movement about the pivotal axis of said segment;
(m) a tracer template having an edge corresponding in shape to said shaping roller exterior outline;
(n) a tracer wheel movably mounted on said arm for engaging and traveling along said tracer template edge; and
(o) valve means communicating with said second extensible member and responsive to travel of said wheel along said tracer template edge thereby positioning said bending roller in spaced relation to said shaping roller exterior outline.

References Cited
UNITED STATES PATENTS

| | | | |
|---|---|---|---|
| 766,826 | 8/1904 | Hjorth | 72—111 |
| 2,308,432 | 1/1943 | Johnson | 72—81 |
| 2,995,170 | 8/1961 | Donato | 72—82 |
| 3,055,414 | 9/1962 | Boldrini | 72—111 |
| 3,141,433 | 7/1964 | Bosch | 72—81 |
| 3,372,567 | 3/1968 | Jensen et al. | 72—80 |
| 3,380,274 | 4/1968 | Gustavsson | 72—85 |

RICHARD J. HERBST, Primary Examiner

U.S. Cl. X.R.

72—85